(12) United States Patent
Ramamurthy et al.

(10) Patent No.: US 9,074,565 B2
(45) Date of Patent: Jul. 7, 2015

(54) DAMPED FUEL DELIVERY SYSTEM

(75) Inventors: Dhyana Ramamurthy, Novi, MI (US); Steve Roseborsky, Kingsville (CN); Tetsuo Ogato, Ann Arbor, MI (US)

(73) Assignees: DENSO International America, Inc., Southfield, MI (US); DENSO CORPORATION, Kariya-shi, Aichi-ken (JP)

( * ) Notice: Subject to any disclaimer, the term of this patent is extended or adjusted under 35 U.S.C. 154(b) by 171 days.

(21) Appl. No.: 13/550,076

(22) Filed: Jul. 16, 2012

(65) Prior Publication Data

US 2014/0014068 A1    Jan. 16, 2014

(51) Int. Cl.
| | |
|---|---|
| *F16L 55/04* | (2006.01) |
| *F02M 69/46* | (2006.01) |
| *F02M 55/02* | (2006.01) |
| *F02M 37/00* | (2006.01) |
| *F16L 55/05* | (2006.01) |

(52) U.S. Cl.
CPC ......... *F02M 55/025* (2013.01); *F02M 37/0041* (2013.01); *F02M 2037/0005* (2013.01); *F16L 55/04* (2013.01); *F16L 55/05* (2013.01); *F02M 69/465* (2013.01); *F02M 2200/26* (2013.01); *F02M 2200/315* (2013.01)

(58) Field of Classification Search
CPC ..... F02M 37/0041; F02M 55/04; F16L 55/04
USPC ............ 123/467, 447, 457, 456, 468; 138/26, 138/27, 28, 29, 30
See application file for complete search history.

(56) References Cited

U.S. PATENT DOCUMENTS

| | | | | |
|---|---|---|---|---|
| 4,649,884 | A * | 3/1987 | Tuckey | 123/457 |
| 4,732,176 | A * | 3/1988 | Sugimura | 138/30 |
| 5,505,181 | A | 4/1996 | McRae et al. | |
| 5,590,631 | A * | 1/1997 | Tuckey | 123/447 |
| 5,618,629 | A * | 4/1997 | Takamatsu et al. | 428/475.5 |
| 5,727,529 | A * | 3/1998 | Tuckey | 123/514 |
| 5,845,621 | A | 12/1998 | Robinson et al. | |
| 5,894,861 | A * | 4/1999 | Lorraine | 138/30 |
| 6,032,651 | A * | 3/2000 | Field | 123/467 |
| 6,079,450 | A * | 6/2000 | Onishi et al. | 138/30 |
| 6,135,092 | A * | 10/2000 | Schaenzer et al. | 123/456 |
| 6,182,637 | B1* | 2/2001 | Kilgore et al. | 123/467 |
| 6,230,685 | B1* | 5/2001 | Kilgore et al. | 123/467 |
| 6,321,719 | B1* | 11/2001 | Schwegler | 123/467 |
| 6,336,442 | B1* | 1/2002 | Kilgore | 123/456 |

(Continued)

FOREIGN PATENT DOCUMENTS

| | | |
|---|---|---|
| EP | 2080894 | 7/2009 |
| JP | S55-020620 | 2/1980 |

(Continued)

OTHER PUBLICATIONS

Office Action issued May 20, 2014 in corresponding JP Application No. 2013-106020 (with English translation).

*Primary Examiner* — Lindsay Low
*Assistant Examiner* — George Jin
(74) *Attorney, Agent, or Firm* — Harness, Dickey & Pierce, P.L.C.

(57) ABSTRACT

A fuel delivery system including a fuel line and a damper. The fuel line extends to a fuel injector and defines a fuel path. The damper is along the fuel path and includes a flexible member and a stop. A first side of the flexible member faces the fuel path and a second side of the flexible member faces the stop.

22 Claims, 5 Drawing Sheets

(56) References Cited

U.S. PATENT DOCUMENTS

| | | | |
|---|---|---|---|
| 6,651,627 B2 | 11/2003 | Zdroik et al. | |
| 6,736,111 B2 * | 5/2004 | Braun et al. | 123/456 |
| 6,802,297 B2 * | 10/2004 | Braun et al. | 123/456 |
| 7,118,140 B2 * | 10/2006 | Kilgore | 285/374 |
| 7,185,636 B2 | 3/2007 | Usui et al. | |
| 7,188,609 B2 * | 3/2007 | Watanabe et al. | 123/456 |
| 7,497,202 B2 * | 3/2009 | Cvengros et al. | 123/456 |
| 7,654,249 B2 * | 2/2010 | Fischer et al. | 123/446 |
| 2003/0106535 A1 * | 6/2003 | Zdroik et al. | 123/456 |
| 2003/0221672 A1 * | 12/2003 | Zdroik et al. | 123/456 |
| 2003/0230282 A1 * | 12/2003 | Braun et al. | 123/456 |
| 2005/0235963 A1 | 10/2005 | Kilgore | |
| 2011/0186015 A1 * | 8/2011 | Hanjagi | 123/457 |
| 2014/0014068 A1 | 1/2014 | Ramamurthy et al. | |

FOREIGN PATENT DOCUMENTS

| | | |
|---|---|---|
| JP | 2005-146976 | 6/2005 |
| JP | 2008-151105 | 7/2008 |
| JP | 2014-020370 | 2/2014 |

* cited by examiner

DAMPED FUEL DELIVERY SYSTEM

FIELD

The present disclosure relates to a damped fuel delivery system.

BACKGROUND

This section provides background information related to the present disclosure which is not necessarily prior art.

Fuel delivery systems, such as combustion engines, can experience fuel pressure variations or pulsations for a variety of reasons. For example, fuel pulsations can be caused by fuel pumps or fuel injectors of the fuel system. Such pulsations can cause an improper quantity of fuel to be delivered to the injectors, which can disrupt the air/fuel ratio. It is thus desirable to maintain the fuel pressure at a constant level and dampen pressure pulsations, which will permit a more accurate quantity of fuel to be delivered to the injectors, and increase gas mileage.

SUMMARY

This section provides a general summary of the disclosure, and is not a comprehensive disclosure of its full scope or all of its features.

The present teachings provide for a fuel delivery system including a fuel line and a damper. The fuel line extends to a fuel injector and defines a fuel path. The damper is along the fuel path and includes a flexible member and a stop. A first side of the flexible member faces the fuel path and a second side of the flexible member faces the stop.

The present teachings further provide for a fuel delivery system including a fuel rail, at least one injector, and a damper. The fuel rail has a first end and a second end opposite to the first end. The first end defines an orifice and an end cap covers the orifice. At least one injector is in cooperation with the fuel rail between the first end and the second end. The damper is mounted at the first end. The damper includes a first member and a second member. The first member is flexible and is in contact with fuel passing through the fuel rail. The second member is between the first member and the end cap.

The present teachings also provide for a fuel delivery system including a fuel line and a damper. The fuel line extends to a fuel injector and defines a fuel path. The damper is arranged along the fuel path and includes a first flexible member and a second flexible member that is more rigid than the first flexible member. The first flexible member and the second flexible member at least partially define a chamber therebetween. A first side of the first flexible member faces the fuel path and a second side of the first flexible member faces the airtight chamber Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
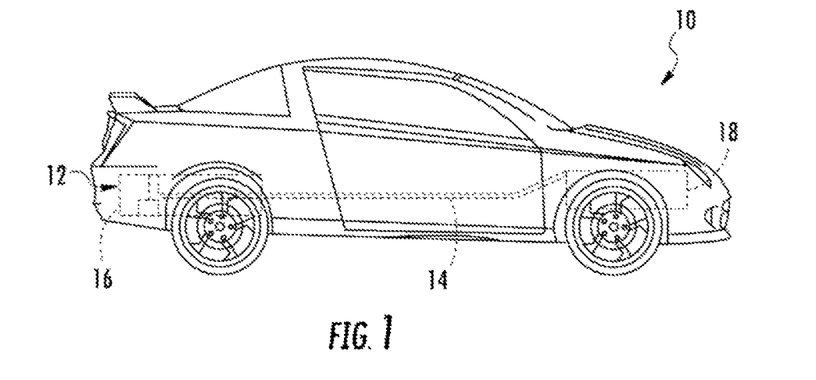
FIG. 1 is a side view of a motor vehicle including a fuel system according to the present teachings.
Figure 2:
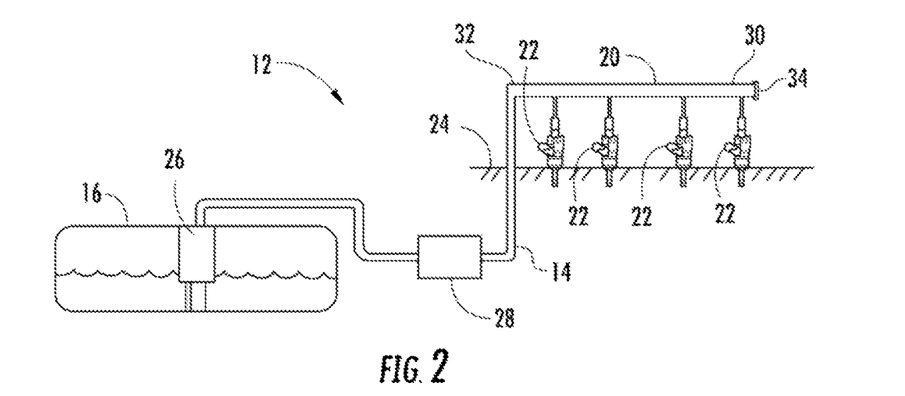
FIG. 2 illustrates the fuel delivery system of FIG. 1.

With initial reference to FIGS. 1 and 2, a vehicle 10 including a fuel delivery system 12 according to the present teachings is illustrated. The fuel delivery system 12 includes a fuel supply line 14 extending between a fuel tank 16 and an engine 18 to deliver fuel to the engine 18. At the engine 18, the fuel supply line 14 includes a fuel rail 20, which delivers fuel to a plurality of fuel injectors 22 connected to the fuel rail 20. The fuel injectors 22 are mounted to a cylinder head 24 of the engine 18.

The fuel delivery system 12 further includes a fuel tank pump 26 and a direct injection fuel pump 28. The fuel tank pump 26 is mounted at the fuel tank 16 and the direct injection fuel pump 28 is mounted along the fuel supply line 14 between the fuel tank 16 and the fuel rail 20. The fuel tank pump 26 pumps fuel out from within the fuel tank 16, and through the fuel supply line 14 to the direct injection fuel pump 28. The direct injection fuel pump 28 pumps the fuel further along the fuel supply line 14 to the fuel rail 20.

Figure 3:
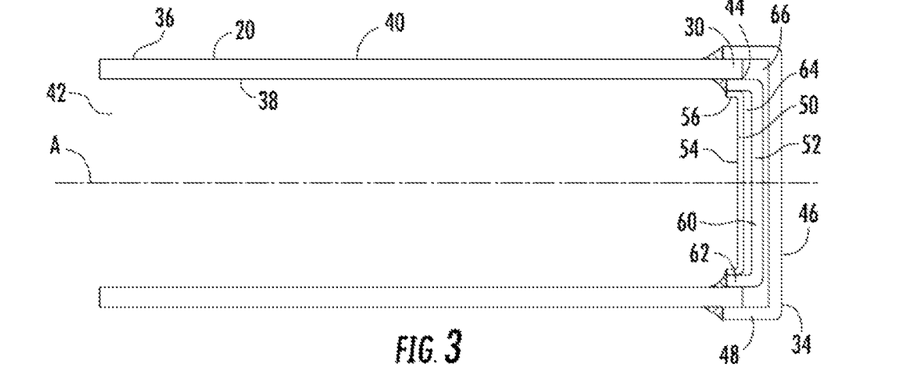
FIG. 3 is a cross-sectional view of an end of a fuel rail of the fuel delivery system of FIG. 1, the fuel rail including a damper according to the present teachings.

With continued reference to FIG. 2 and additional reference to FIG. 3, the fuel rail 20 includes a first end 30 and a second end 32 that is opposite to the first end 30. The first end 30 is covered with an end cap 34. The second end transitions to a remainder of the fuel supply line 14 that extends from the direct injection fuel pump 28. A body 36 of the fuel rail 20 extends between the first end 30 and the second end 32.

The fuel rail 20 is generally a cylindrical pipe that extends along a longitudinal axis A, as illustrated in FIG. 3 for example. The longitudinal axis A extends through an axial center of the fuel rail 20 along a length of the fuel rail 20 from the first end 30 to the second end 32. The body 36 includes an inner surface 38 and an outer surface 40 that is opposite to the inner surface 38. The inner surface 38 defines a fuel pathway 42 that extends between the first end 30 and the second end 32. At the first end 30, the inner surface 38 defines an orifice 44.

The end cap 34 is mounted to the first end 30 to cover and close the orifice 44. The end cap 34 can be mounted in any suitable manner, such as by brazing, and can be mounted to the inner surface 38, the outer surface 40, or to the first end 30 such that the end cap 34 extends from the first end 30. The end cap 34 generally includes a disk-shaped planar portion 46 with a circular flange 48 extending from an outer peripheral edge of the planar portion 46. The end cap 34 can define an opening, such as along the longitudinal axis A. As further described herein, the end cap 34 can be or define a stop.

A first flexible member 50 and a second flexible member 52 are mounted at or proximate to the first end 30. The first flexible member 50 includes a circular body 54 and a flange 56 extending from a circumference of the circular body 54. The second flexible member 52 also includes a circular body 60 and a flange 62 extending from a circumference of the circular body 60. The circular body 60 of the second flexible member 52 has a greater thickness than the circular body 54 of the first flexible member 50, and thus the second flexible member 52 has a greater stiffness than, and is less flexible than, the first flexible member 50. While the bodies 54 and 60 are described as being circular, they can be provided with any other suitable shape, such as any shape corresponding to the shape of the inner surface 38. For example, if the inner surface 38 is generally square in cross-section, then the circular bodies 54 and 60 can also be square.

The second flexible member 52 is connected directly to the body 36 at either the inner surface 38 or the outer surface 40. For example and as illustrated in FIG. 3, the second flexible member 52 is connected to the inner surface 38 by securing the flange 62 to the inner surface 38 in any suitable manner, such as by brazing for example. The flange 62 can also be secured to the outer surface 40. The first flexible member 50 can be mounted directly to the fuel rail 20, or can be mounted directly to the second flexible member 52, as illustrated in FIG. 3. As illustrated, the first flexible member 50 is nested within the second flexible member 52 such that the flange 56 of the first flexible member 50 is secured to the flange 62 of the second flexible member 52.

While two flexible members 50 and 52 are illustrated, any suitable number of flexible members can be included and nested together in a manner similar to how the first flexible member 50 is nested with the second flexible member 52. The additional flexible members can be arranged such that the thinnest and least rigid flexible member is furthest from the end cap 34, and the thickest and most rigid flexible member is closest to the end cap 34. The flexible members, including the flexible members 50 and 52, can be made of any suitable material, such as any suitable metallic or polymeric material.

The circular body 54 of the first flexible member 50 is spaced apart from the circular body 60 of the second flexible member 52 to define a first chamber 64 therebetween. The first flexible member 50 is hermetically sealed to the second flexible member 52 so that the first chamber 64 is at least substantially airtight. The second flexible member 52 is spaced apart from the end cap 34 to define a second chamber 66 between the second flexible member 52 and the end cap 34. The end cap 34 and the second flexible member 52 are hermetically sealed to the body 36 such that the second chamber 66 is at least substantially airtight. One or both of the first chamber 64 and the second chamber 66 can be filled with air or any suitable fluid. The chambers 64 and 66 may be pressurized to a predetermined pressure or to atmospheric pressure. Alternatively, the chambers 64 and 66 need not be sealed. For example, when the end cap 34 is provided with an opening, the second chamber 66 will not be sealed.

Figure 4:
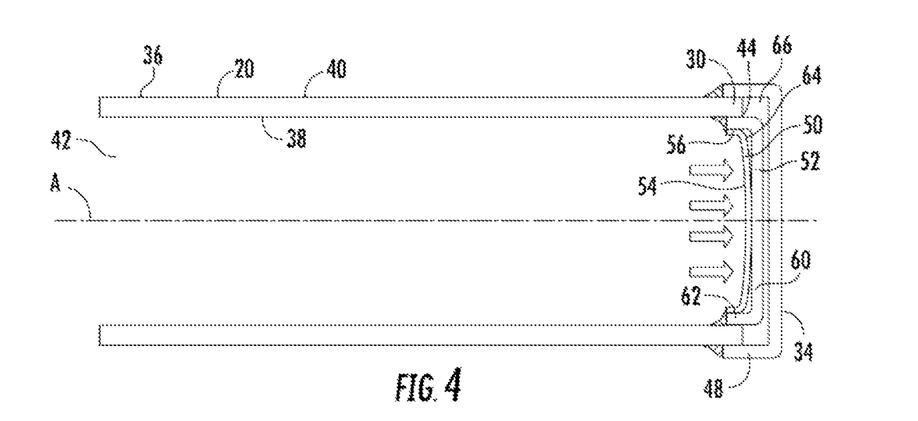
FIG. 4 is a cross-sectional view of the end of the fuel rail including the damper, the damper flexed to a first position.

The first and the second flexible members 50 and 52, along with the first and the second chambers 64 and 66, generally define a damper of the fuel rail 20. With additional reference to FIGS. 4 and 5, operation of the damper will now be described. As pressure pulses of fuel are pumped into and through the fuel rail 20, the fuel contacts the first flexible member 50 and applies pressure to the first flexible member 50. In response, the first flexible member 50 deflects or flexes toward the end cap 34 to increase the volume of the fuel rail 20 and absorb the pulsation. At relatively low pressures, such as about 4 MPa, the first flexible member 50 will flex such that the circular body 54 of the first flexible member 50 contacts the second flexible member 52, but does not displace the second flexible member 52. By "bottoming out" against the second flexible member 52, excessive flexing or deformation of the first flexible member 50 can be avoided, which increases reliability of the first flexible member 50.

Figure 5:
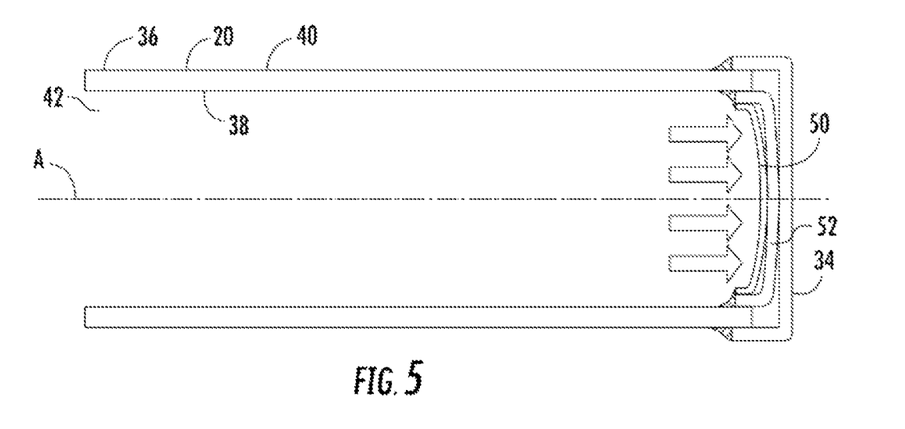
FIG. 5 is a cross-sectional view of the end of the fuel rail including the damper, the damper flexed to a second position.

As illustrated in FIG. 5, at relatively higher pressures, such as about 15 MPa, pressure exerted by the fuel on the first flexible member 50 will be sufficient to cause the first flexible member 50 to contact the second flexible member 52 and move the second flexible member 52 toward the end cap 34, whereby the end cap 34 will provide or define a stop. If the pressure exerted by the fuel is great enough, the second flexible member 52 will contact the end cap 34 and "bottom out" against the end cap 34. The end cap 34 is sufficiently rigid such that the end cap 34 will not bend or deflect in response to pressure exerted thereon by the second flexible member 52. Thus, pressure pulses of fuel flowing through the fuel rail 20 are dampened by the first and second flexible members 50 and 52, as well as the first and the second airtight chambers 64 and 66, particularly when the airtight chambers 64 and 66 are filled with a liquid or are pressurized.

Figure 6:
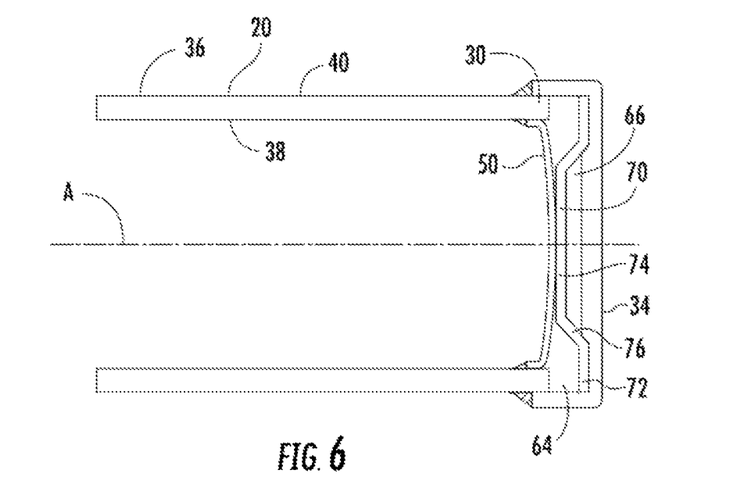
FIG. 6 is a cross-sectional view of the end of the fuel rail including another damper according to the present teachings.

With additional reference to FIG. 6, the second flexible member 52 can take the form of a spring 70. The spring 70 generally includes, a peripheral portion 72 and a center portion 74 surrounded by the peripheral portion 72. An angled portion 76 connects the peripheral portion 72 to the center portion 74. The peripheral portion 72 and the center portion 74 are generally arranged in offset, but parallel planes. The spring 70 generally has a circular shape, the outer circumference of which is defined by the peripheral portion 72. The spring 70 may be provided with any other suitable shape as well.

The spring 70 is positioned between the first flexible member 50 and the end cap 34. The spring 70 is oriented such that the peripheral portion 72 is seated on or against the end cap 34, and the center portion 74 abuts the first flexible member 50. The first chamber 64 is defined between the first flexible member 50, and between the peripheral portion 72 and the angled portion 76 of the spring 70. The second chamber 66 is defined between the center portion 74 and the portion of the end cap 34 opposite to the center portion 74. Like the second flexible member 52, the spring 70 dampens pressure pulses of fuel injected through the fuel rail 20. The spring 70 and the second flexible member 52 function in a similar manner. In some applications, the spring 70 may be more suited to dampen high pressure pulses than the second flexible member 52 due to the configuration and arrangement of the second flexible member 52.

Figure 7:
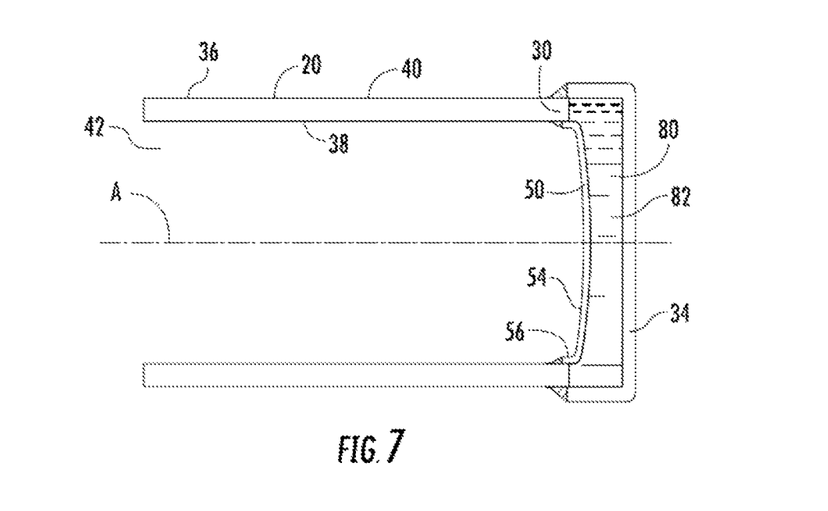
FIG. 7 is a cross-sectional view of the end of the fuel rail including an additional damper according to the present teachings.

With additional reference to FIG. 7, the second flexible member 52 can take the form of a fluid 80. The fluid 80 is arranged between the first flexible member 50 and the end cap 34 in an airtight cavity 82. The airtight cavity 82 is defined by the first flexible member 50, the end cap 34, and at least a portion of the first end 30 of the fuel rail 20, as illustrated in FIG. 7. Alternatively, the first flexible member 50 and the end cap 34 can be arranged such that the airtight cavity 82 is defined by only the first flexible member 50 and the end cap 34, such as by mounting the flange 56 of the first flexible member 50 to the outer surface 40 of the body 36.

The fluid 80 can be any suitable fluid with a bulk modulus lower than that of the fuel of the fuel tank 16, such as gasoline or any other injected fuel. The fluid 80 may be pressurized, and thus may or may not be above atmospheric pressure. The fluid 80 serves to further dampen fuel pulses present within the fuel rail 20, particularly pulses of high relative pressures. For example, when fuel applies sufficient pressure to the first flexible member 50 such that the first flexible member 50 deforms and flexes towards the end cap 34, the fluid 80 between the first flexible member 50 and the end cap 34 further absorbs the pressure exerted on the first flexible member 50 and prevents both excess deformation and flexing of the first flexible member 50 towards the end cap 34.

Figure 8:
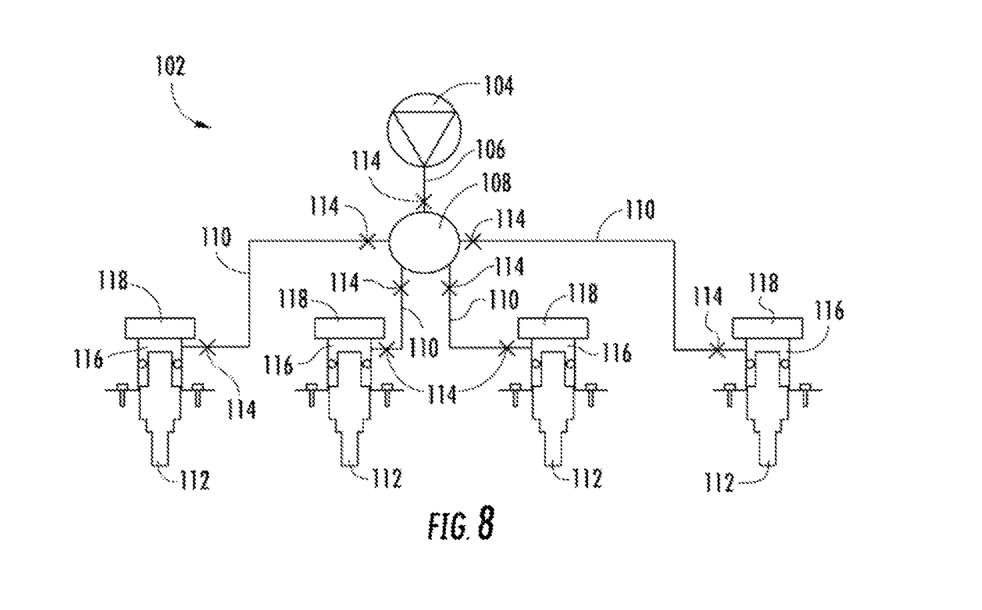
FIG. 8 illustrates another fuel delivery system according to the present teachings.

With reference to FIG. 8, another fuel delivery system according to the present teachings is illustrated at reference numeral 102. The system 102 generally includes a high pressure fuel pump 104, a trunk fuel line or main fuel line 106, a junction box 108, a plurality of branch fuel lines 110, and a plurality of fuel injectors 112. Each of the fuel injectors 112 are mounted to the cylinder head 24 of the engine 18 (see FIGS. 1 and 2 for illustrations of cylinder head 24 and engine 18). The main fuel line 106 connects the high pressure fuel pump 104 to the junction box 108 so that fuel from the fuel tank 16 can be pumped to the junction box 108. The plurality of branch fuel lines 110 extend from the junction box 108, and each one of the branch fuel lines 110 extends to a different fuel injector 112. Thus, the fuel delivery system 102 does not include a fuel rail. Instead, fuel is delivered to each fuel injector 22 by a separate branch fuel line 110.

One or more fuel flow restrictors 114 may be arranged along the main fuel line 106 and/or along the branch fuel lines 110 to attenuate a fuel pressure wave therein. Any suitable restrictor can be used, such an orifice plate. The restrictors 114 can be arranged at any suitable location, such as proximate to the junction box 108 and/or proximate to the fuel injectors.

Each fuel injector 112 includes a fuel cup 116 and fuel cap 118. The fuel cap 118 can be integral with the fuel cup 116 or mounted thereto in any suitable manner, such as by brazing. The branch fuel lines 110 are individually connected to the fuel cups 116 to deliver fuel to the fuel injectors 112. With additional reference to FIG. 9, between the fuel cup 116 and the fuel cap 118 is an aperture 120 defined by a surface of the fuel cup 116 and/or the fuel cap 118. Extending from the aperture 120 into the fuel cup 116 is a flange 122. The flange 122 and the aperture 120 permit passage of fuel between the fuel cup 116 and the fuel cap 118. The size of the aperture 120 and the length of the flange 122 can be varied depending on the frequency of the fuel pulse to be dampened or eliminated.

Figure 9:
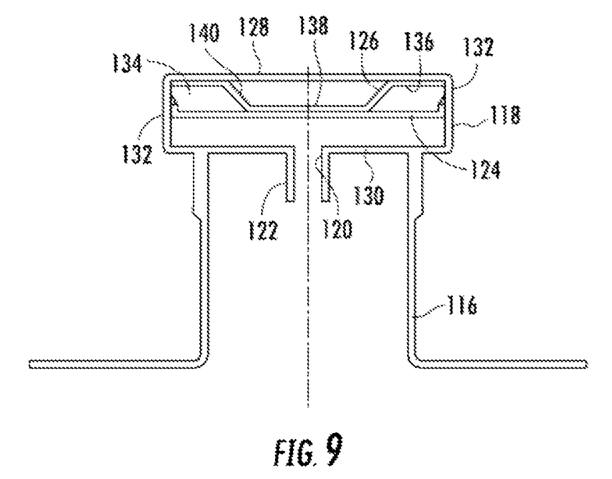
FIG. 9 is a cross-sectional view of a fuel cup and a fuel cap of the fuel delivery system of FIG. 8, the fuel cap including a damper according to the present teachings.

The fuel cap 118 provides a damper for dampening pressure pulses of fuel that reach the fuel cup 116. The fuel cap 118 includes a first flexible member 124 and a second flexible member 126. The first flexible member 124 is substantially similar to the first flexible member 50 described above, and thus the description of the first flexible member 50 also applies to the first flexible member 124. The second flexible member 126 is substantially similar to the spring 70 described above, and thus the description of the spring 70 also applies to the second flexible member 126.

The fuel cap 118 generally includes a top surface 128, a bottom surface 130, and a side surface 132 extending between the top and bottom surfaces 128 and 130. The top surface 128 and the bottom surface 130 are generally circular in shape. The side surface 132 is generally round and extends about outer diameters of each of the top surface 128 and the bottom surface 130. The aperture 120 is defined by the bottom surface 130. The first flexible member 124 is about halfway between the top surface 128 and the bottom surface 130. The first flexible member 124 has a size and shape such that the first flexible member 124 extends across both the top and bottom surfaces 128 and 130 and such that the first flexible member 124 contacts the side surface 132 continuously about an outer periphery of the first flexible member 124. The first flexible member 124 can be secured to the side surface 132 in any suitable manner, such as by brazing, welding, or with a suitable mechanical fastener. The first flexible member 124 is sealed to the side surface 132 to define an airtight, hermitically sealed chamber 134 between the first flexible member 124 and the top surface 128. Alternatively, the top surface 128 can include an opening, and thus the chamber 134 need not be sealed. Furthermore, the flange 122 and the bottom surface 130 of the fuel cap 118 are optional and need not be included.

The second flexible member 126 is mounted within the chamber 134. A peripheral portion 136 of the second flexible member 126 is seated against the top surface 128 and may be mounted to the top surface 128. A center portion 138 is offset from the peripheral portion 136 and contacts the first flexible member 124. The center portion 138 is connected to the peripheral portion 136 with angled portion 140. The first flexible member 124 and the second flexible member 126 together provide the fuel cap 118 with a damper.

Fuel delivered to the fuel cup 116 by one of the branch fuel lines 110 passes through the aperture 120 and into the fuel cap 118. The fuel contacts the first flexible member 124 and, if the pressure of the fuel is great enough, causes the first flexible member 124 to deform and flex towards the top surface 128 and increase the volume of portion of the fuel cap 118 between the bottom surface 130 and the first flexible member 50. The second flexible member 126 prevents excessive flexing and deformation of the first flexible member 124, and thus allows higher pressure fuel pulses to be dampened. The top surface 128, alone or in combination with the side surface 132, acts as a stop for the second flexible member 126.

Figure 10:
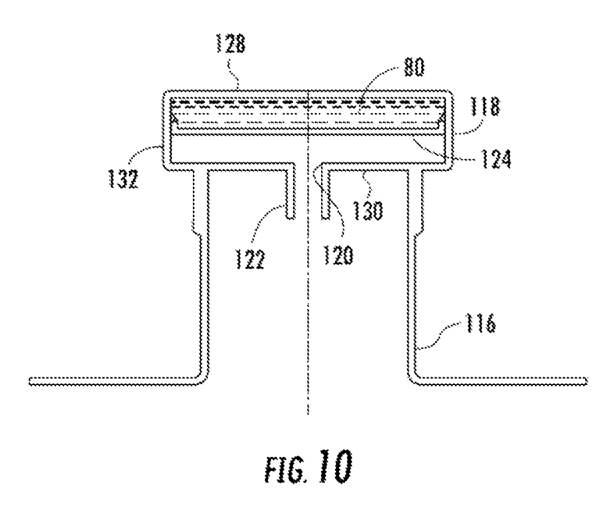
FIG. 10 is a cross-sectional view of the fuel cup and the fuel cap of the fuel delivery system of FIG. 8, the fuel cap including another damper according to the present teachings.

With additional reference to FIG. 10, the second flexible member 126 can be replaced with the fluid 80. As described above, the fluid 80 can be any suitable fluid with a bulk modulus that is less than that of the fuel delivered to the fuel cup 116. The fluid 80 may or may not be above the atmospheric pressure of the fuel cup 116 and the portion of the fuel cap 118 between the first flexible member 124 and the bottom surface 130.

In addition to including the first flexible member 124 and either the second flexible member 126 or the fluid 80, the fuel caps 118 of the fuel delivery system 102 can also include the first and the second flexible members 50 and 52 illustrated in FIGS. 3 and 5 nested with one another. Thus, the fuel delivery system 102 moves the dampers closer to the fuel cups 116 associated therewith, which are often the source of the pressure pulses.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fuel delivery system comprising:
   a fuel line extending to a fuel injector, the fuel line defining a fuel path;

a damper along the fuel path, the damper including a first flexible member and a stop, a first side of the first flexible member faces the fuel path and a second side of the first flexible member faces the stop;

a second flexible member disposed between the first flexible member and the stop, the second flexible member including a center portion, an angular portion extending from the center portion to define a conical surface and a peripheral portion extending from the angular portion in a direction parallel with the center portion, the peripheral portion being spaced from and parallel to the center portion; wherein the center portion of the second flexible member abuts the first flexible member to define a first chamber between the first flexible member and the angled and peripheral portions of the second flexible member; and the peripheral portion of the second flexible member is seated on the stop to define a second chamber between the center portion of the second flexible member and the stop.

2. The fuel delivery system of claim 1, further comprising a plurality of the fuel lines and a plurality of fuel injectors, each one of the plurality of fuel lines is in direct fluid communication with only one of the plurality of fuel injectors.

3. The fuel delivery system of claim 2, wherein each one of the plurality of fuel injectors includes a fuel cup associated therewith, and a cap connected to the fuel cup, the cap including the first flexible member and defining the stop, a chamber is defined between the first flexible member and the stop.

4. The fuel delivery system of claim 3, wherein the fuel cup and the fuel cap define an opening therebetween.

5. The fuel delivery system of claim 2, further comprising a junction box, each one of the plurality of the fuel lines extend from the junction box, a single trunk fuel line extends between a fuel pump and the junction box.

6. The fuel delivery system of claim 1, wherein the second flexible member is a spring between the first flexible member and the stop, the spring in direct contact with the first flexible member and the stop.

7. The fuel delivery system of claim 1, wherein the stop is a cap including a chamber partially defined by the first flexible member, the chamber including a fluid.

8. The fuel delivery system of claim 7, wherein the chamber is hermetically sealed.

9. The fuel delivery system of claim 1, further comprising:
an end cap sealed to an end of the fuel line and covering an orifice of the fuel line, the first flexible member is connected directly to one of the second flexible member or the fuel line, the second flexible member is connected directly to the fuel line proximate to the orifice and is arranged between the first flexible member and the end cap, the end cap including the stop.

10. A fuel delivery system comprising:
a fuel line extending to a fuel injector, the fuel line defining a fuel path; and
a damper arranged along the fuel path, the damper includes a first flexible member and a second flexible member that is more rigid than the first flexible member, the first flexible member and the second flexible member at least partially define a first chamber therebetween, a first side of the first flexible member faces the fuel path and a second side of the first flexible member faces the chamber; wherein the second flexible member includes a center portion, an angular portion extending from the center portion to define a conical surface and a peripheral portion extending from the angular portion in a direction parallel with the center portion, the peripheral portion being spaced from and parallel to the center portion; wherein the center portion of the second flexible member abuts the first flexible member to define the first chamber between the first flexible member and the angled and peripheral portions of the second flexible member; and the peripheral portion of the second flexible member is seated on the stop to define a second chamber between the center portion of the second flexible member and the stop.

11. The fuel delivery system of claim 10, wherein the second flexible member is a spring.

12. The fuel delivery system of claim 10, wherein the second flexible member is thicker in cross-section than the first flexible member.

13. The fuel delivery system of claim 10, wherein the first flexible member is mounted to the second flexible member, and the second flexible member is mounted to the fuel line.

14. The fuel delivery system of claim 10, further comprising a plurality of fuel lines, a plurality of fuel injectors, and a plurality of dampers, each one of the plurality of fuel lines is in direct fluid communication with only one of the plurality of fuel injectors, and each one of the plurality of dampers is connected to only one of the plurality of fuel injectors.

15. The fuel delivery system of claim 10, wherein a volume of the fuel line increases when the first flexible member is flexed toward the second flexible member by fuel within the fuel line.

16. The fuel delivery system of claim 1, further comprising:
a fuel rail having a first end and a second end opposite to the first end, the first end defines an orifice;
an end cap covering the orifice, the end cap defining the stop; wherein
the fuel injector is in cooperation with the fuel rail between the first end and the second end;
the damper is mounted at the first end and includes the flexible member, the second flexible member and the stop;
the first flexible member is in contact with fuel passing through the fuel rail; and
the second flexible member is disposed between the first flexible member and the end cap.

17. The fuel delivery system of claim 16, wherein:
the first flexible member is mounted directly to one of the second flexible member or the fuel rail, and the second flexible member is mounted directly to the fuel rail, the second flexible member is more rigid than the first flexible member;
the first flexible member flexes to contact and flex the second flexible member in response to pressure exerted upon the first flexible member by fuel within the fuel rail;
the end cap defines the stop for the second flexible member; and
the damper defines a chamber.

18. The fuel delivery system of claim 16, wherein the second flexible member is a spring in contact with both the first flexible member and the end cap.

19. The fuel delivery system of claim 16, wherein the second flexible member is a fluid and the damper defines a chamber.

20. The fuel delivery system of claim 16, further comprising the fuel rail defining a volume that increases when the first flexible member flexes toward the end cap.

21. The fuel delivery system of claim 1, wherein the first flexible member is fixedly attached to an inner periphery of the fuel line.

22. The fuel delivery system of claim 10, wherein the first flexible member is fixedly attached to an inner periphery of the fuel line.

* * * * *